(12) United States Patent
Donnelli et al.

(10) Patent No.: US 8,306,726 B2
(45) Date of Patent: Nov. 6, 2012

(54) POSITION MONITORING SYSTEM FOR A MOBILE MACHINE

(75) Inventors: Aaron Michael Donnelli, Metamora, IL (US); Craig Lawrence Koehrsen, East Peoria, IL (US); Kenneth L Stratton, Dunlap, IL (US); Joshua Struble, Sahuarita, AZ (US)

(73) Assignee: Caterpillar Inc., Peoria, IL (US)

( * ) Notice: Subject to any disclaimer, the term of this patent is extended or adjusted under 35 U.S.C. 154(b) by 445 days.

(21) Appl. No.: 12/453,038

(22) Filed: Apr. 28, 2009

(65) Prior Publication Data

US 2010/0274434 A1 Oct. 28, 2010

(51) Int. Cl.
*G01C 21/00* (2006.01)
*G08G 1/123* (2006.01)

(52) U.S. Cl. ............ 701/216; 701/220; 701/29; 701/31; 701/207; 340/989

(58) Field of Classification Search .................... 701/29, 701/31, 50, 207, 213, 214, 216, 220; 340/438, 340/989, 992
See application file for complete search history.

(56) References Cited

U.S. PATENT DOCUMENTS

| | | | |
|---|---|---|---|
| 5,512,904 A | 4/1996 | Bennett | |
| 5,517,419 A | 5/1996 | Lanckton et al. | |
| 5,657,025 A | 8/1997 | Ebner et al. | |
| 5,877,723 A | 3/1999 | Fan | |
| 5,906,655 A | 5/1999 | Fan | |
| 6,128,501 A | 10/2000 | Ffoulkes-Jones | |
| 6,408,245 B1 * | 6/2002 | An et al. | 701/216 |
| 6,424,914 B1 | 7/2002 | Lin | |
| 6,484,096 B2 | 11/2002 | Wong et al. | |
| 6,732,051 B1 | 5/2004 | Kirk et al. | |
| 6,784,833 B1 * | 8/2004 | Evans | 342/357.31 |
| 6,792,353 B2 * | 9/2004 | Lin | 701/213 |
| 6,831,599 B2 | 12/2004 | Morgan | |
| 6,859,729 B2 | 2/2005 | Breakfield et al. | |
| 7,027,919 B2 | 4/2006 | Bernesi et al. | |
| 7,245,215 B2 | 7/2007 | Göllü et al. | |
| 7,286,933 B2 | 10/2007 | Cho | |
| 7,292,223 B2 | 11/2007 | Suprun et al. | |
| 7,756,529 B2 * | 7/2010 | Hashimoto | 455/456.2 |
| 2003/0083815 A1 | 5/2003 | Denton | |
| 2007/0257837 A1 | 11/2007 | Watanabe et al. | |
| 2008/0109166 A1 | 5/2008 | Takaoka et al. | |
| 2009/0048779 A1 | 2/2009 | Zeng et al. | |
| 2009/0099772 A1 | 4/2009 | Chiu et al. | |
| 2009/0265104 A1 * | 10/2009 | Shroff | 701/216 |

FOREIGN PATENT DOCUMENTS

EP 1930693 6/2008

* cited by examiner

*Primary Examiner* — Sarah B McPartlin
(74) *Attorney, Agent, or Firm* — Finnegan, Henderson, Farabow, Garrett & Dunner LLP

(57) ABSTRACT

A system including a mobile machine and a central control station is provided. The mobile machine includes a communication device and a position monitoring system including a receiver configured to receive position data from a positioning satellite and generate a position signal. The position monitoring system also includes an inertial navigation unit including a sensor configured to measure a parameter of the mobile machine and generate a movement signal. The position monitoring system also includes a controller configured to receive the position signal and the movement signal, detect an unavailability of the position signal, calculate a position parameter, determine whether a difference between a first and a second value of a parameter exceeds a predetermined threshold, and generate a warning signal. The central control station is configured to communicate with the controller, receive the position signal and/or the movement signal, and monitor the position of the mobile machine.

27 Claims, 4 Drawing Sheets

POSITION MONITORING SYSTEM FOR A MOBILE MACHINE

TECHNICAL FIELD

The present disclosure relates generally to a position monitoring system and, more particularly, to a position monitoring system for a mobile machine.

BACKGROUND

Position monitoring systems have been employed in mobile machines, such as earthmoving machines, for monitoring the position and guiding the travel of the machines. A typical position monitoring system includes a GPS (global positioning system) receiver located on-board a mobile machine to receive position data from a plurality of GPS satellites. In some circumstances, for example, when the machine is traveling within a tunnel, GPS signals may become unavailable. In such circumstances, an inertial navigation system may be employed to supplement the GPS system and to provide position data for the mobile machine. Such an inertial navigation system typically includes various inertial sensors, such as speed sensors, acceleration sensors, gyroscopes, etc.

A navigation apparatus is described in U.S. Patent Application Publication No. 2008/0109166 A1 (the '166 publication) to Takaoka et al. published on May 8, 2008. The navigation apparatus of the '166 publication includes a GPS processing section which receives and processes GPS signals, and an acceleration sensor. When the GPS signals become unavailable, position data is calculated based on acceleration signals provided by the acceleration sensor, and learning results provided by a learning section of an arithmetic processing unit which learns various parameters from previously received GPS signals before the GPS signals become unavailable.

Although the navigation apparatus of the '166 publication may provide autonomous position data when GPS signals become unavailable, the navigation apparatus may be problematic. For example, at least one of the GPS processing section and the acceleration sensor may malfunction and provide faulty position data, and the navigation apparatus of the '166 publication may not have the capacity to diagnose and detect such a malfunction.

The present disclosure is directed toward improvements in the existing technology.

SUMMARY

In one aspect, the present disclosure is directed to a system. The system includes a mobile machine including a communication device and a position monitoring system associated with the mobile machine. The position monitoring system includes a receiver configured to receive position data from a positioning satellite and generate a position signal based on the received position data. The receiver is located on-board the mobile machine. The position monitoring system also includes an inertial navigation unit including a sensor configured to measure a parameter associated with movement of the mobile machine, and generate a movement signal based on the measured parameter. The inertial navigation unit is located on-board the mobile machine. The position monitoring system also includes a controller associated with the receiver and the inertial navigation unit. The controller is configured to receive the position signal when the position signal is available, receive the movement signal, and detect an unavailability of the position signal. The controller is also configured to calculate a position parameter for the mobile machine based on the received movement signal and the position signal received before detection of the unavailability of the position signal, determine whether a difference between a first value of a parameter determined from the position signal and a second value of the same parameter determined from the movement signal exceeds a predetermined threshold, and generate a warning signal after determining that the difference exceeds the predetermined threshold. The system also includes a central control station configured to communicate with the controller through the communication device, receive the position signal and/or the movement signal through the communication device, and monitor the position of the mobile machine.

In another aspect, the present disclosure is directed to a system. The system includes a mobile machine including a communication device and a position monitoring system associated with the mobile machine. The position monitoring system includes a receiver configured to receive position data from a positioning satellite and to generate a position signal based on the received position data. The receiver is located on-board the mobile machine. The position monitoring system also includes an inertial navigation unit including a sensor configured to measure a parameter associated with movement of the mobile machine, and generate a movement signal based on the measured parameter. The inertial navigation unit is located on-board the mobile machine. The position monitoring system also includes a controller associated with the receiver and the inertial navigation unit. The controller is configured to receive the position signal when the position signal is available, receive the movement signal, and detect an unavailability of the position signal. The controller is also configured to calculate a position parameter for the mobile machine based on the received movement signal and the position signal received before detection of the unavailability of the position signal, determine whether a difference between a first value of a parameter determined from the position signal and a second value of the same parameter determined from the movement signal exceeds a predetermined threshold, and generate a warning signal after determining that the difference exceeds the predetermined threshold. The system also includes a central control station configured to communicate with the controller through the communication device, receive the position signal and/or the movement signal through the communication device, and monitor the position of the mobile machine. The position monitoring system further includes a ground-based positioning system configured to provide position data associated with the movement of the mobile machine. The controller is further configured to calculate a third value of the same parameter, compare the first, second, and third values of the same parameter, and determine whether a difference between any one of the first, second, and third values and the remaining two of the first, second, and third values exceeds a predetermined threshold. The controller is further configured to determine whether a self-diagnosis is to be conducted, and save the received position signal as a last position signal after the self-diagnosis is conducted and after determining that the difference between any one of the first, second, and third values and the remaining two of the first, second, and third values does not exceed the predetermined threshold.

DETAILED DESCRIPTION

Figure 1:
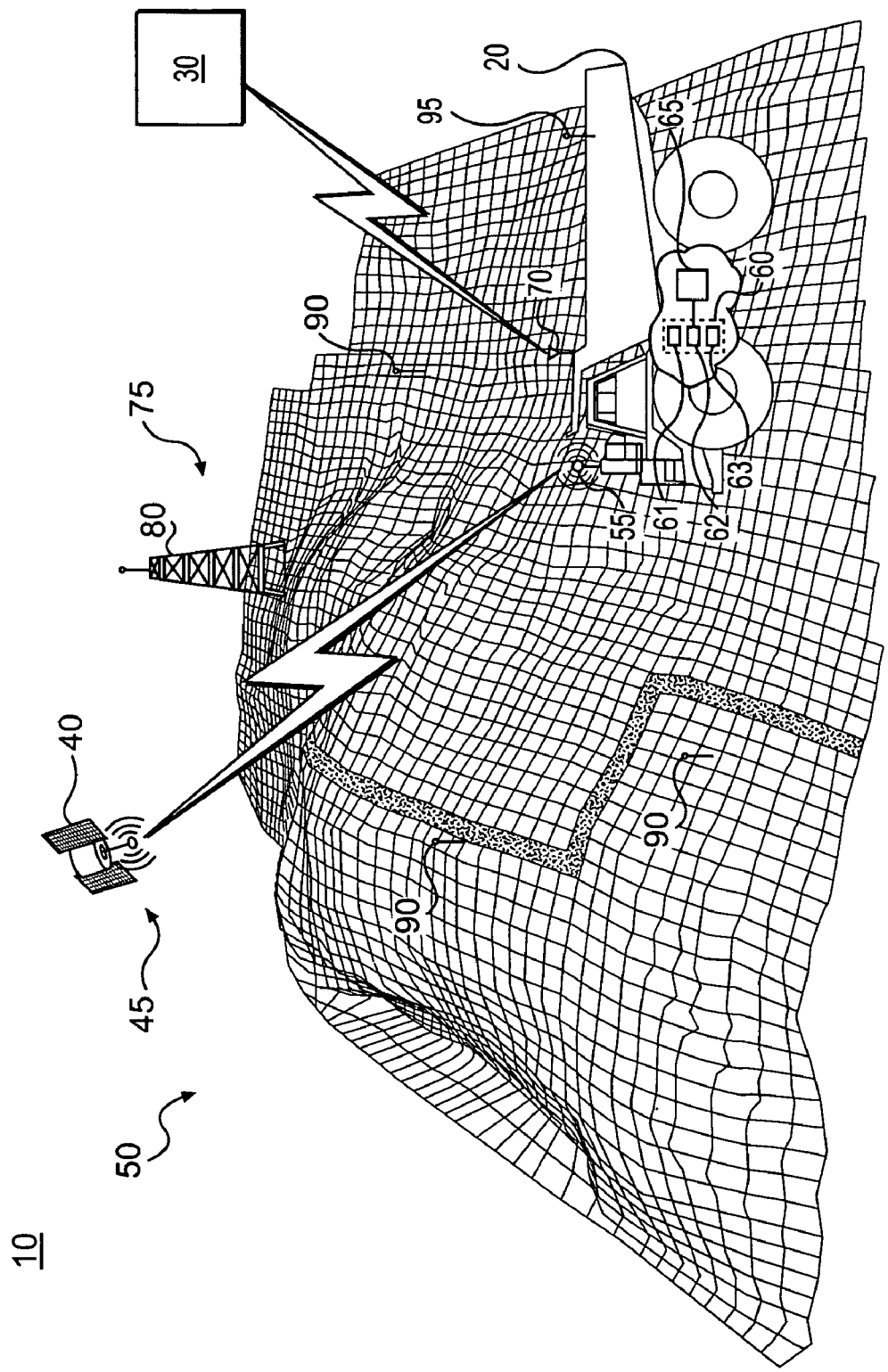
FIG. 1 is a schematic illustration of an exemplary disclosed system having an exemplary position monitoring system.

FIG. 1 is a schematic illustration of an exemplary system 10. System 10 may be employed in a wide variety of applications, such as mobile machine management in mining fields and construction fields, etc. System 10 may be a networked worksite. System 10 may include at least one mobile machine 20. System 10 may also include a central control station 30 configured to communicate with mobile machine 20, for example, by sending and receiving signals to and from mobile machine 20 through wired or wireless means. Central control station 30 may be located at the worksite, or may be remotely located.

System 10 may include a position monitoring system 50, which may include at least one positioning system or device configured to provide position data for mobile machine 20 and/or central control station 30. For example, position monitoring system 50 may include a Global Positioning System (GPS) 45, which may include a receiver 55 configured to communicate with at least one GPS satellite 40. Receiver 55 may be located on-board mobile machine 20, and may be configured to receive position data from GPS satellite 40. Receiver 55 may generate positioning signals based on the received GPS position data. It is contemplated that receiver 55 may also send signals to GPS satellite 40. When GPS signals from satellite 40 become unavailable to receiver 55, for example, when mobile machine 20 is traveling within a tunnel, a signal indicative of the unavailability of the GPS signals may be generated, for example, by receiver 55.

Position monitoring system 50 may also include at least one or more additional positioning systems for monitoring the position of mobile machine 20. For example, position monitoring system 50 may include an inertial navigation unit 60.

Inertial navigation unit 60 may be located on-board mobile machine 20. Inertial navigation unit 60 may include one or more sensors configured to measure one or more parameters associated with the movement of mobile machine 20. In one embodiment, as shown in FIG. 1, inertial navigation unit 60 may include a speed sensor 61, an acceleration sensor 62, and a steering direction sensor 63. Speed sensor 61 may be configured to measure the speed of mobile machine 20. Acceleration sensor 62 may be configured to measure an acceleration of mobile machine 20. Steering direction sensor 63 may be configured to measure a steering or movement direction of mobile machine 20. It is contemplated that inertial navigation unit 60 may include other types of sensors, and may include a greater or a lesser number of sensors. For example, in some embodiments, inertial navigation unit 60 may not include speed sensor 61. In some embodiments, inertial navigation unit 60 may include additional sensors, such as a barometer configured to measure the altitude of the location of mobile machine 20, an odometer configured to measure a traveling distance of mobile machine 20, etc. In some embodiments, inertial navigation unit 60 may include a gyroscope, which may include acceleration sensor 62 as a component.

In some embodiments, position monitoring system 50 may further include a ground-based positioning system 75 configured to determine movement parameters, such as, position, speed, acceleration, altitude, angular rate, pitch rate, etc., of mobile machine 20. Ground-based positioning system 75 may be any suitable ground based positioning systems, such as, for example, a laser-based positioning system. Ground-based positioning system 75 may include a station 80, a receiving device 95, and a plurality of devices 90. Station 80 may be configured to emit and/or receive signals, and may be configured to communicate with at least one of the receiving device 95 and the devices 90.

Receiving device 95 may be located on-board mobile machine 20 to receive the signals from station 80. Devices 90 may be sensors, emitters, or receivers, and may be located at various locations on the ground. Devices 90 may communicate with receiving device 95 and/or station 80 to determine a movement parameter of mobile machine 20. The ground-based positioning system 75 may communicate with central control station 30. For example, at least one of station 80, devices 90, and receiving device 95 may send the measured movement parameter to central control station 30. Central control station 30 may also send command signals to at least one of station 80, devices 90, and receiving device 95. It is contemplated that ground-based positioning system 75 may be any suitable ground-based systems, such as, for example, a laser ground-based positioning system, and may include a greater or lesser number of components.

Position monitoring system 50 may include a controller 65. Controller 65 may be located on-board mobile machine 20, or may be located at other suitable locations, for example, at central control station 30. Mobile machine 20 may include a communication device 70 configured to communicate with central control station 30. Controller 65 may be an existing machine controller or a stand-alone controller on-board mobile machine 20. Controller 65 may be in communication with various systems and devices, for example, at least one of receiver 55, communication device 70, and inertial navigation unit 60. Controller 65 may also communicate with at least one of station 80, devices 90, and receiving device 95. Communication between controller 65 and other systems or devices may be in wired or wireless means known in the art. As shown in FIG. 1, controller 65 may be in communication with the sensors provided within inertial navigation unit 60, such as speed sensor 61, acceleration sensor 62, and/or steering direction sensor 63. Controller 65 may be configured to receive the position signals generated by receiver 55 when GPS signals are available. When GPS signals become unavailable to receiver 55, controller 65 may also receive a signal generated by receiver 55 that indicates the unavailability of the GPS signals. Thus, controller 65 may be configured to detect the availability and/or unavailability of the GPS signals.

Controller 65 may also be configured to receive movement signals generated by inertial navigation unit 60, such as signals indicative of the speed, acceleration, and/or traveling direction of mobile machine 20, which may be generated by speed sensor 61, acceleration sensor 62, and/or steering direction sensor 63, respectively, based on sensed movement parameters. Controller 65 may process the received movement signals and calculate parameters related to the position of mobile machine 20. Controller 65 may also receive command signals from central control station 30 through communication device 70. Conversely, controller 65 may send signals, such as position signals indicative of the position of mobile machine 20, warning signals, etc., to central control station 30 through communication device 70.

In one embodiment, controller 65 may also be configured to receive positioning signals generated by ground-based positioning system 75. In one embodiment, positioning signals generated by ground-based positioning system 75 may be sent to central control station 30, which may then send the positioning signals to controller 65 through communication device 70. In one embodiment, controller 65 may be located within central control station 30, and may receive positioning signals sent from ground-based positioning system 75 at central control station 30.

Industrial Applicability

Figure 2:
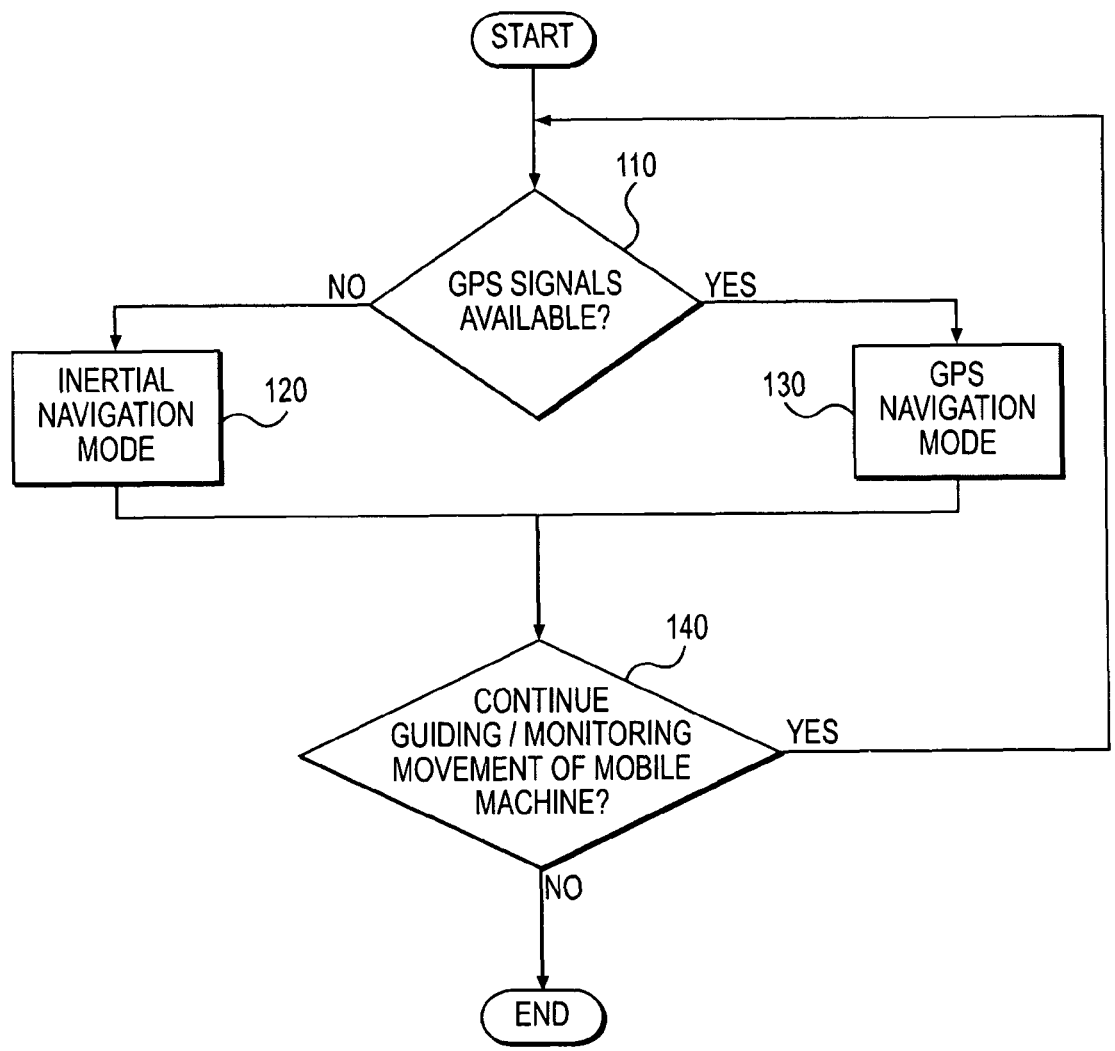
FIG. 2 is a diagrammatic illustration of an exemplary operation of the disclosed position monitoring system of FIG. 1.

An exemplary operation process of the disclosed position monitoring system 50 is diagrammatically illustrated in a flowchart shown in FIG. 2. At Step 110, position monitoring system 50 may determine whether GPS signals are available. The determination of whether GPS signals are available may be performed by controller 65. Under normal operating conditions, i.e., when the GPS signals are available, receiver 55 may receive position data from GPS satellite 40, and may generate position signals based on the received position data. Receiver 55 may send the position signals to controller 65. When the GPS signals become unavailable to receiver 55, for example, when mobile machine 20 is traveling within a tunnel, receiver 55 may generate a signal indicative of the unavailability of the GPS signals, and may send the signal indicative of the unavailability to controller 65. Controller 65 may thus detect or determine the unavailability of the GPS signals based on the signal generated by receiver 55.

If GPS signals are available (Yes, Step 110), position monitoring system 50 may execute a GPS navigation mode (Step 130), for example, to provide position data for the movement of mobile machine 20. If GPS signals are not available (No, Step 110), position monitoring system 50 may execute an inertial navigation mode (Step 120), for example, to provide position data for the movement of mobile machine 20. Controller 65 may be configured to select the inertial navigation mode (a first navigation mode) or the GPS navigation mode (a second navigation mode) based on the determination of the availability of the GPS signals. The details of the GPS navigation mode and the inertial navigation mode will be discussed below. After completing one of the GPS navigation mode (Step 130) and the inertial navigation mode (Step 120), position monitoring system 50 may determine, for example, by controller 65, whether or not to continue guiding or monitoring the movement of mobile machine 20 (Step 140). If controller 65 determines to continue guiding or monitoring the movement of mobile machine 20 (Yes, Step 140), position monitoring system 50 may continue the process with Steps 110-140. If controller 65 determines not to continue guiding or monitoring the movement of mobile machine 20 (No, Step 140), position monitoring system 50 may terminate the process shown in FIG. 2.

Figure 3:
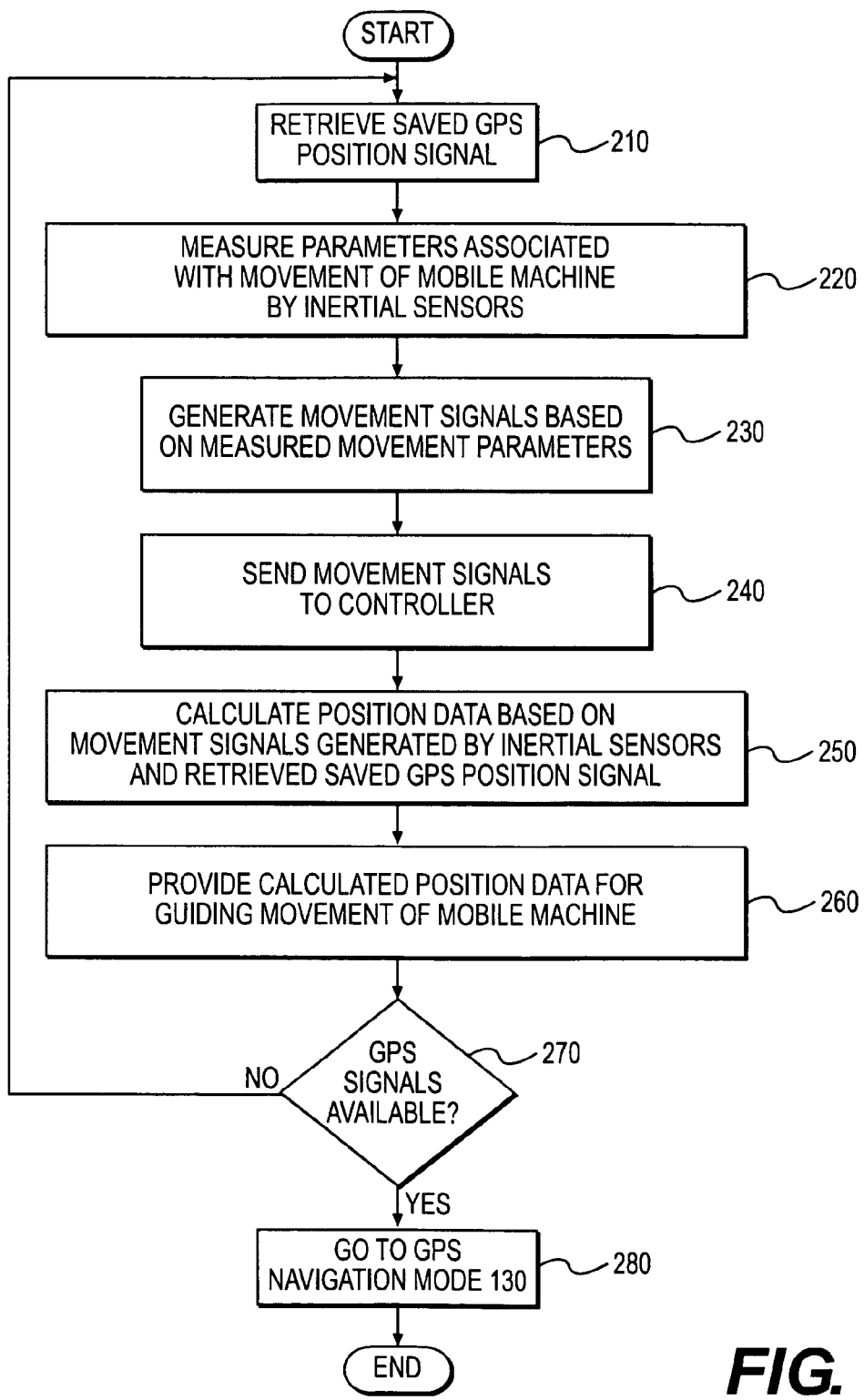
FIG. 3 is a diagrammatic illustration of an exemplary operation of the disclosed position monitoring system of FIG. 1.

FIG. 3 diagrammatically illustrates an exemplary operation process of the inertial navigation mode in Step 120 shown in FIG. 2. The exemplary inertial navigation mode may be executed when GPS signals are not available. Controller 65 may retrieve a previously saved GPS position signal, for example, from a data storage device, such as a memory (Step 210). In one embodiment, the saved GPS position signal may include a last saved GPS position signal before the detection of the unavailability of the GPS signals. Alternatively, in some embodiments, the saved GPS position signal may include a plurality of saved GPS position signals before the detection of the unavailability of the GPS signals. In Step 220, parameters associated with the movement of mobile machine 20 may be measured by the inertial sensors of inertial navigation unit 60. Movement signals may be generated by the inertial sensors based on the measured movement parameters (Step 230). For example, speed sensor 61 may measure the speed of mobile machine 20 and generate a signal indicative of the measured speed. Acceleration sensor 62 may measure the acceleration of mobile machine 20 and generate a signal indicative of the measured acceleration. Steering direction sensor 63 may measure the moving direction of mobile machine 20 and generate a signal indicative of the measured moving direction. These signals may be sent from inertial navigation unit 60 to controller 65 for processing (Step 240). It is contemplated that the inertial sensors may continuously measure movement parameters and generate signals indicative of the measured parameters, or may measure movement parameters and generate signals according to a predetermined time interval.

Still referring to FIG. 3, in Step 250, controller 65 may calculate position data based on the movement signals generated by the inertial sensors of inertial navigation unit 60 and the retrieved saved GPS position signal, such as the last saved GPS position signal received by receiver 55 before the detection of the unavailability of GPS signals. The calculated position data may include the current location of mobile machine 20, and/or any suitable parameter associated with the movement of mobile machine 20, such as estimated moving direction, speed, acceleration, etc. The calculated position data may be provided for guiding the movement of mobile machine 20 (Step 260). For example, controller 65 may provide the calculated position data to an operator of mobile machine 20 through a wired or wireless communication means, or to a remote operator located in central control station 30 via communication device 70.

Position monitoring system 50 may monitor whether GPS signals are available after completing Step 260, or alternatively, at any suitable time before completing Step 260. Position monitoring system 50 may determine whether GPS signals are available (Step 270). If GPS signals are still unavailable (No, Step 270), position monitoring system 50 may continue to execute Steps 220-270 to utilize inertial navigation unit 60 to provide position data for mobile machine 20. It is contemplated that when Steps 220-270 are repeated in situations where GPS signals are unavailable, the calculation of the position data may be based on at least one of the previously calculated position data, the retrieved GPS signal saved before the detection of unavailability of GPS signals, and the movement parameters currently measured by the inertial sensors. If GPS signals become available (Yes, Step 270), position monitoring system 50 may go to the GPS navigation mode shown in Step 130 of FIG. 2 (Step 280), and may terminate the inertial navigation mode shown in FIG. 3.

Figure 4:
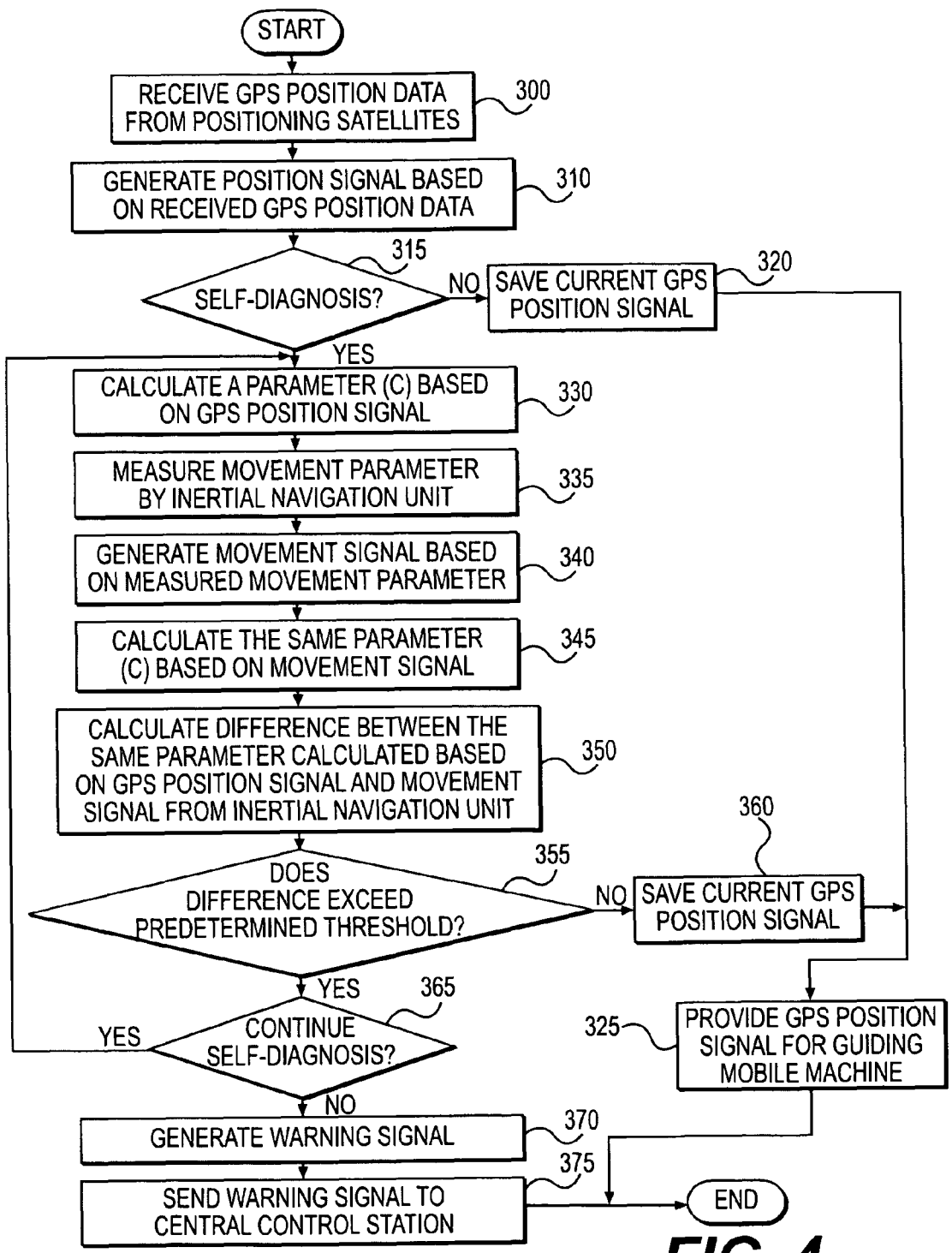
FIG. 4 is a diagrammatic illustration of an exemplary operation of the disclosed position monitoring system of FIG. 1.

FIG. 4 diagrammatically illustrates an exemplary GPS navigation mode shown in Step 130 of FIG. 2. In this exemplary GPS navigation mode, receiver 55 may receive GPS position data from GPS satellite 40 (Step 300). Receiver 55 may generate a GPS position signal based on the received GPS position data (Step 310). The GPS position signal may be sent from receiver 55 to controller 65. Controller 65 may receive the GPS position signal sent from receiver 55, and determine whether a self-diagnosis is to be performed (Step 315). If controller 65 determines that a self-diagnosis is not to be performed (No, Step 315), controller 65 may process the received GPS position signal and save the received GPS position signal. In one embodiment, controller 65 may save the received GPS position signal as the last received GPS signal (Step 320). It is contemplated that in order to determine whether to perform a self-diagnosis, controller 65 may receive input from the operator of mobile machine 20, or from the operator of central control station 30. If no self-diagnosis is to be performed (No, Step 315), the GPS position signal may be further provided, for example, to central control station 30, or being processed by controller 65 for guiding the movement of mobile machine 20 (Step 325). It is contemplated that Step 325 may be executed prior to Step 320. In the embodiment shown in FIG. 4, after Step 325 is completed, the GPS navigation mode may be terminated. After the GPS navigation mode is terminated, position monitoring system 50 may execute Step 140 shown in FIG. 1.

Still referring to FIG. 4, if controller 65 determines that a self-diagnosis is to be performed (Yes, Step 315), controller 65 may calculate a first value of a parameter C based on the received GPS position signal (Step 330). The parameter C may be any suitable parameter that may be calculated based on the received GPS position signal and the movement signals generated by the inertial sensors. For example, the parameter C may be the present location of mobile machine 20, or the speed, acceleration, and/or steering direction of the movement of mobile machine 20.

Inertial navigation unit 60 may measure parameters associated with the movement of mobile machine 20 by one or more inertial sensors (Step 335). For example, speed sensor 61 may measure the speed of mobile machine 20, acceleration sensor 62 may measure the acceleration of mobile machine 20, and steering direction sensor 63 may measure the steering or traveling direction of mobile machine 20. Inertial navigation unit 60 may generate movement signals indicative of the measured movement parameters and may send the movement signals to controller 65 (Step 340). Controller 65 may receive and process the movement signals generated by inertial navigation unit 60. Controller 65 may calculate a second value of the same parameter C based on the received movement signals (Step 345). Alternatively, in some embodiments, inertial navigation unit 60 may include a processor configured to process the movement signals generated by the inertial sensors, and to calculate the second value of the same parameter C. The second value of the same parameter C calculated by the processor may then be sent to controller 65 for comparison with the first value of the same parameter C calculated based on the GPS signal in Step 330.

After having calculated the first value of the same parameter C based on the GPS position signal (Step 330) and the second value based on the movement signals (Step 345), controller 65 may calculate a difference between the first and second values of the same parameter C (Step 350). Controller 65 may determine whether the difference exceeds a predetermined threshold (Step 355). For example, controller 65 may determine whether a difference in the position of mobile machine 20 calculated based on the GPS position signal and based on the movement signals respectively exceeds a predetermined threshold. If the difference is greater than the predetermined threshold (Yes, Step 355), which may indicate malfunctioning of, for example, one of the GPS receiver 55 and the inertial navigation unit 60, controller 65 may determine whether the self-diagnosis shall be continued and repeated. If controller 65, the operator of mobile machine 20, or the operator at central control station 30 determines to continue the self-diagnosis, the Steps 330-355 may be repeated. If it is determined that no self-diagnosis is to be continued (No, Step 365), controller 65 may generate a warning signal (Step 370), and may send the warning signal to central control station 30 through communication device 70 (Step 375). After the warning signal is sent to central control station 30, the GPS navigation mode may be terminated. The warning signal may indicate that at least one of the GPS receiver 55 or inertial navigation unit 60 may not be functioning normally and may require further diagnosis, repair, or replacement.

Referring back to Step 355, if the difference between the first and second values of the same parameter C does not exceed the predetermined threshold (No, Step 355), controller 65 may save the received GPS position signal, for example, in a storage device, such as a memory (Step 360). In one embodiment, controller 65 may save the received GPS position signal as the last received GPS signal. The received GPS position signal may be provided for guiding the movement of mobile machine 20 (Step 325). For example, the received GPS position signal may be sent to central control station 30 via communication device 70, or may be displayed on a display located on-board mobile machine 20. After Step 325 is completed, the GPS navigation mode may be terminated.

In some embodiments, all of the GPS 45, inertial navigation unit 60, and ground-based positioning system 75 may be employed together to monitor the position of mobile machine 20. For example, central control station 30 or controller 65 may receive position data generated by each one of GPS 45, inertial navigation unit 60, and ground-based positioning system 75, and may diagnose whether one or more systems are not operating normally based on the received position data. Controller 65 may calculate a third value of the same parameter C based on position data generated by ground-based positioning system 75. Controller 65 may determine whether a self-diagnosis is to be conducted using position data provided by all of GPS 45, inertial navigation unit 60, and ground-based positioning system 75. The self-diagnosis may be conducted based on the first, second, and third values. Controller 65 may compare the first, second, and third values of the same parameter C, and determine whether a difference between any one of the first, second, and third values and the remaining two of the first, second, and third values exceeds a predetermined threshold. For example, if the second and the third values are close to one another, and if the difference between the first value and the second and third values exceeds a predetermined threshold, controller 65 may determine that the first value may be incorrect or invalid. This may indicate that GPS 45 may not be operating normally, and the position data provided by receiver 55 may not be reliable for monitoring and guiding the movement of mobile machine 20. In such a situation, when GPS signals are invalid, e.g., due to unavailability of the GPS signals, at least one of inertial navigation unit 60 and ground-based positioning system 75 may provide position data for monitoring and guiding the movement of mobile machine 20. On the other hand, if the difference among the first, second, and third values of the same parameter C is within a predetermined threshold, it may indicate that all of GPS 45, inertial navigation unit 60, and ground-based positioning system 75 are operating normally, and the position data provided by each one of the GPS system 45, inertial navigation unit 60, and ground-based positioning system 75 may be used for guiding the movement of mobile machine 20. Controller 65 may save the received GPS position signal as a last GPS position signal after the self-diagnosis is conducted and after determining that the difference between any one of the first, second, and third values and the remaining two of the first, second, and third values does not exceed the predetermined threshold. This may ensure the correctness of position data provided to guide mobile machine 20.

The disclosed position monitoring system may be employed in any mobile machines for monitoring the position and/or guiding the movement of the mobile machines. At least one of the inertial navigation unit and ground-based positioning system may provide position data for guiding the movement of a mobile machine when GPS position signals are unavailable. When the GPS position signals are available, at least one of the inertial navigation unit and ground-based positioning system may be used to verify whether the GPS signals are valid. Automatic self-diagnosis may be regularly performed to ensure the validity of the GPS signals and/or other positioning signals provided by at least one of the inertial navigation unit and ground-based positioning system. On the other hand, self-diagnosis may also indicate whether any positioning system is not functioning properly. The disclosed position monitoring system may enhance the reliability and quality of position monitoring of mobile machine 20.

It will be apparent to those skilled in the art that various modifications and variations can be made in the disclosed position monitoring system. Other embodiments will be apparent to those skilled in the art from consideration of the specification and practice of the disclosed embodiments herein. It is intended that the specification and examples be considered as exemplary only, with a true scope of the disclosure being indicated by the following claims.

What is claimed is:

1. A system, comprising:
    a mobile machine including a communication device, and
        a position monitoring system associated with the mobile machine, the position monitoring system including:
            a receiver configured to receive position data from a positioning satellite and to generate a position signal based on the received position data, the receiver being located on-board the mobile machine;
            an inertial navigation unit including a sensor configured to measure a parameter associated with movement of the mobile machine, and to generate a movement signal based on the measured parameter, the inertial navigation unit being located on-board the mobile machine; and
            a controller associated with the receiver and the inertial navigation unit, and being configured to:
                receive the position signal when the position signal is available;
                receive the movement signal;
                detect an unavailability of the position signal;
                calculate a position parameter for the mobile machine based on the received movement signal and the position signal received before detection of the unavailability of the position signal;
                determine whether a difference between a first value of a parameter determined from the position signal and a second value of the same parameter determined from the movement signal exceeds a predetermined threshold, wherein the controller is configured to save the position signal after determining that the difference between the parameter determined from the position signal and the same parameter determined from the movement signal does not exceed the predetermined threshold; and
                generate a warning signal after determining that the difference exceeds the predetermined threshold; and
    a central control station configured to:
        communicate with the controller through the communication device;
        receive the position signal and/or the movement signal through the communication device; and
        monitor the position of the mobile machine.

2. The system of claim 1, wherein the sensor includes a speed sensor configured to measure a speed of the mobile machine.

3. The system of claim 1, wherein the sensor includes an acceleration sensor configured to measure an acceleration of the mobile machine.

4. The system of claim 1, wherein the sensor includes a direction sensor configured to measure a movement direction of the mobile machine.

5. The system of claim 1, wherein the controller is further configured to determine whether a self-diagnosis is to be conducted.

6. The system of claim 1, wherein the controller is further configured to select a first navigation mode or a second navigation mode based on an availability of the position signal generated based on position data received from the positioning satellite.

7. The system of claim 1, wherein the controller is further configured to determine whether a self-diagnosis is to be conducted, and to save the received position signal as a last position signal after the self-diagnosis is conducted and after determining that the difference does not exceed the predetermined threshold.

8. The system of claim 1, wherein the controller is further configured to save the position signal received from the positioning satellite as a last position signal received from the positioning satellite, and to calculate the position parameter based on the received movement signal and the last position signal received before detection of the unavailability of the position signal.

9. The system of claim 1, wherein the position monitoring system further includes a ground-based positioning system configured to provide position data associated with the movement of the mobile machine, and wherein the controller is further configured to:
    calculate a third value of the same parameter;
    compare the first, second, and third values of the same parameter; and
    determine whether a difference between any one of the first, second, and third values and the remaining two of the first, second, and third values exceeds a predetermined threshold.

10. A system, comprising:
    a mobile machine including a communication device, and
        a position monitoring system associated with the mobile machine, the position monitoring system including:
            a receiver configured to receive position data from a positioning satellite and to generate a position signal based on the received position data, the receiver being located on-board the mobile machine;
            an inertial navigation unit including a sensor configured to measure a parameter associated with movement of the mobile machine, and to generate a movement signal based on the measured parameter, the inertial navigation unit being located on-board the mobile machine; and
            a controller associated with the receiver and the inertial navigation unit, and being configured to:
                receive the position signal when the position signal is available;
                receive the movement signal;
                detect an unavailability of the position signal;
                calculate a position parameter for the mobile machine based on the received movement signal and the position signal received before detection of the unavailability of the position signal;

determine whether a difference between a first value of a parameter determined from the position signal and a second value of the same parameter determined from the movement signal exceeds a predetermined threshold; and generate a warning signal after determining that the difference exceeds the predetermined threshold; and a central control station configured to:
communicate with the controller through the communication device;
receive the position signal and/or the movement signal through the communication device; and
monitor the position of the mobile machine;

and wherein the position monitoring system further includes a ground-based positioning system configured to provide position data associated with the movement of the mobile machine, and wherein the controller is further configured to:
calculate a third value of the same parameter;
compare the first, second, and third values of the same parameter; and
determine whether a difference between any one of the first, second, and third values and the remaining two of the first, second, and third values exceeds a predetermined threshold, and wherein the controller is further configured to determine whether a self-diagnosis is to be conducted, and save the received position signal as a last position signal after the self-diagnosis is conducted and after determining that the difference between any one of the first, second, and third values and the remaining two of the first, second, and third values does not exceed the predetermined threshold.

11. The system of claim 10, wherein the sensor includes a speed sensor configured to measure a speed of the mobile machine.

12. The system of claim 10, wherein the sensor includes an acceleration sensor configured to measure an acceleration of the mobile machine.

13. The system of claim 10, wherein the sensor includes a direction sensor configured to measure a movement direction of the mobile machine.

14. The system of claim 10, wherein the controller is further configured to select a first navigation mode or a second navigation mode based on an availability of the position signal generated based on position data received from the positioning satellite.

15. The system of claim 10, wherein the controller is further configured to calculate the position parameter based on the received movement signal and the saved last position signal received before detection of the unavailability of the position signal.

16. A system, comprising:
a mobile machine including a communication device, and a position monitoring system associated with the mobile machine, the position monitoring system including:
a receiver configured to receive position data from a positioning satellite and to generate a position signal based on the received position data, the receiver being located on-board the mobile machine;
an inertial navigation unit including a sensor configured to measure a parameter associated with movement of the mobile machine, and to generate a movement signal based on the measured parameter, the inertial navigation unit being located on-board the mobile machine; and
a controller associated with the receiver and the inertial navigation unit, and being configured to:
receive the position signal when the position signal is available;
receive the movement signal;
detect an unavailability of the position signal;
calculate a position parameter for the mobile machine based on the received movement signal and the position signal received before detection of the unavailability of the position signal;
determine whether a difference between a first value of a parameter determined from the position signal and a second value of the same parameter determined from the movement signal exceeds a predetermined threshold; and
generate a warning signal after determining that the difference exceeds the predetermined threshold; and a central control station configured to:
communicate with the controller through the communication device;
receive the position signal and/or the movement signal through the communication device; and
monitor the position of the mobile machine;

and wherein the controller is further configured to:
select a first navigation mode or a second navigation mode based on an availability of the position signal generated based on position data received from the positioning satellite; and
determine whether a self-diagnosis is to be conducted, and save the received position signal as a last position signal after the self-diagnosis is conducted and after determining that the difference does not exceed the predetermined threshold.

17. The system of claim 16, wherein the sensor includes a speed sensor configured to measure a speed of the mobile machine.

18. The system of claim 16, wherein the sensor includes an acceleration sensor configured to measure an acceleration of the mobile machine.

19. The system of claim 16, wherein the sensor includes a direction sensor configured to measure a movement direction of the mobile machine.

20. A system, comprising:
a mobile machine including a communication device, and a position monitoring system associated with the mobile machine, the position monitoring system including:
a receiver configured to receive position data from a positioning satellite and to generate a position signal based on the received position data, the receiver being located on-board the mobile machine;
an inertial navigation unit including a sensor configured to measure a parameter associated with movement of the mobile machine, and to generate a movement signal based on the measured parameter, the inertial navigation unit being located on-board the mobile machine; and
a controller associated with the receiver and the inertial navigation unit, and being configured to:
receive the position signal when the position signal is available;
receive the movement signal;
detect an unavailability of the position signal;
calculate a position parameter for the mobile machine based on the received movement signal and the position signal received before detection of the unavailability of the position signal;

determine whether a difference between a first value of a parameter determined from the position signal and a second value of the same parameter determined from the movement signal exceeds a predetermined threshold;

generate a warning signal after determining that the difference exceeds the predetermined threshold;

determine whether a self-diagnosis is to be conducted; and save the received position signal as a last position signal after the self-diagnosis is conducted and after determining that the difference does not exceed the predetermined threshold; and a central control station configured to:
communicate with the controller through the communication device;
receive the position signal and/or the movement signal through the communication device; and
monitor the position of the mobile machine.

21. The system of claim 20, wherein the sensor includes a speed sensor configured to measure a speed of the mobile machine.

22. The system of claim 20, wherein the sensor includes an acceleration sensor configured to measure an acceleration of the mobile machine.

23. The system of claim 20, wherein the sensor includes a direction sensor configured to measure a movement direction of the mobile machine.

24. The system of claim 20, wherein the controller is configured to save the position signal after determining that the difference between the parameter determined from the position signal and the same parameter determined from the movement signal does not exceed the predetermined threshold.

25. The system of claim 20, wherein the controller is further configured to select a first navigation mode or a second navigation mode based on an availability of the position signal generated based on position data received from the positioning satellite.

26. The system of claim 20, wherein the controller is further configured to save the position signal received from the positioning satellite as a last position signal received from the positioning satellite, and to calculate the position parameter based on the received movement signal and the last position signal received before detection of the unavailability of the position signal.

27. The system of claim 20, wherein the position monitoring system further includes a ground-based positioning system configured to provide position data associated with the movement of the mobile machine, and wherein the controller is further configured to:
calculate a third value of the same parameter;
compare the first, second, and third values of the same parameter; and
determine whether a difference between any one of the first, second, and third values and the remaining two of the first, second, and third values exceeds a predetermined threshold.

* * * * *

UNITED STATES PATENT AND TRADEMARK OFFICE
CERTIFICATE OF CORRECTION

PATENT NO. : 8,306,726 B2
APPLICATION NO. : 12/453038
DATED : November 6, 2012
INVENTOR(S) : Donnelli et al.

Page 1 of 1

It is certified that error appears in the above-identified patent and that said Letters Patent is hereby corrected as shown below:

In the Specification

Column 5, line 11, delete "Industrial Applicability" and insert -- INDUSTRIAL APPLICABILITY --.

Signed and Sealed this
Eighteenth Day of August, 2015

Michelle K. Lee
*Director of the United States Patent and Trademark Office*